United States Patent [19]
Watanabe

[11] Patent Number: 5,904,608
[45] Date of Patent: May 18, 1999

[54] POLISHING APPARATUS HAVING INTERLOCK FUNCTION

[75] Inventor: Katsuhide Watanabe, Fujisawa, Japan

[73] Assignee: Ebara Corporation, Tokyo, Japan

[21] Appl. No.: 08/865,993

[22] Filed: May 30, 1997

[30] Foreign Application Priority Data

May 30, 1996 [JP] Japan .................................. 8-161146

[51] Int. Cl.⁶ .................................................. B24B 51/00
[52] U.S. Cl. ................................. 451/5; 451/9; 451/41; 451/21; 451/287; 364/474.17; 364/474.06
[58] Field of Search ................... 451/41, 5, 9, 285–290, 451/21, 8, 28; 364/474.17, 474.06, 172, 508, 468.28; 125/11.01

[56] References Cited

U.S. PATENT DOCUMENTS

| | | |
|---|---|---|
| 3,813,828 | 6/1974 | Bennett . |
| 3,829,750 | 8/1974 | Centner et al. ..................... 364/474.06 |
| 5,069,002 | 12/1991 | Sandhu et al. ............................ 451/41 |
| 5,070,655 | 12/1991 | Aggarwal ........................... 364/474.06 |
| 5,222,329 | 6/1993 | Yu ................................................ 451/5 |
| 5,308,438 | 5/1994 | Cote et al. ................................ 451/41 |
| 5,421,769 | 6/1995 | Schultz et al. ............................ 451/41 |
| 5,439,551 | 8/1995 | Meikle et al. . |
| 5,486,131 | 1/1996 | Cesna et al. ............................ 451/443 |
| 5,587,915 | 12/1996 | Nagatomi .......................... 364/474.17 |
| 5,664,987 | 9/1997 | Renteln ..................................... 451/21 |

FOREIGN PATENT DOCUMENTS

| | | |
|---|---|---|
| 0 616 362 | 9/1994 | European Pat. Off. . |
| 0 658 400 | 6/1995 | European Pat. Off. . |
| 63-212465 | 9/1988 | Japan . |
| 05277929 | 10/1993 | Japan . |
| 06270054 | 9/1994 | Japan . |
| 07112363 | 5/1995 | Japan . |
| 07112365 | 5/1995 | Japan . |
| 7-112365 | 5/1995 | Japan . |

OTHER PUBLICATIONS

IEEE Technical Paper In Situ CMP Monitoring Technique for Multi–layer Interconnection by Fukuroda et al, 1995.

*Primary Examiner*—Robert A. Rose
*Assistant Examiner*—George Nguyen
*Attorney, Agent, or Firm*—Wenderoth, Lind & Ponack, L.L.P.

[57] ABSTRACT

A polishing apparatus is used for polishing a workpiece such as a semiconductor wafer to a flat mirror finish. The polishing apparatus has an interlock function includes a turntable having a polishing surface thereon, a top ring for holding a workpiece to be polished and pressing the workpiece against the polishing surface on the turntable, a first motor for rotating the turntable, and a second motor for rotating the top ring. The polishing apparatus further comprises a first actuator for lifting and lowering the top ring, a second actuator for moving the top ring in a horizontal direction, and a control unit for controlling the motors and the actuators. The control unit controls the motors and the actuators in such a manner that when an abnormality is detected in at least one of the motors and the actuators, at least one of the motors and the actuators other than that of the abnormality performs a predetermined operation.

34 Claims, 6 Drawing Sheets

B ALLOWABLE LEVEL

FIG. 3B

A ALLOWABLE LEVEL

POLISHING APPARATUS HAVING INTERLOCK FUNCTION

BACKGROUND OF THE INVENTION

1. Field of the Invention

The present invention relates to a polishing apparatus for polishing a workpiece such as a semiconductor wafer to a flat mirror finish, and more particularly to a polishing apparatus having an interlock function which can perform a predetermined operation such as shutdown of a plurality of components in the overall apparatus when an abnormality is detected in at least one of motors and actuators of the apparatus by, for example, measuring magnitudes of the torques of the motors or measuring magnitude of vibration of a top ring.

2. Description of the Prior Art

Recent rapid progress in semiconductor device integration demands smaller and smaller wiring patterns or interconnections and also narrower spaces between interconnections which connect active areas. One of the processes available for forming such interconnections is photolithography. Though the photolithographic process can form interconnections that are at most 0.5 μm wide, it requires that surfaces on which pattern images are to be focused by a stepper be as flat as possible because the depth of focus of the optical system is relatively small.

It is therefore necessary to make the surfaces of semiconductor wafers flat for photolithography. One customary way of flattening the surfaces of semiconductor wafers is to polish them with a polishing apparatus, and such a process is called Chemical Mechanical polishing.

Conventionally, a polishing apparatus has a turntable and a top ring which rotate at respective individual speeds. A polishing cloth is attached to the upper surface of the turntable. A semiconductor wafer to be polished is placed on the polishing cloth and clamped between the top ring and the turntable. An abrasive liquid containing abrasive grains is supplied onto the polishing cloth and retained on the polishing cloth. During operation, the top ring exerts a certain pressure on the turntable, and the surface of the semiconductor wafer held against the polishing cloth is therefore polished to a flat mirror finish while the top ring and the turntable are rotated.

In the conventional polishing apparatus, a motor for rotating the turntable, the motor for swinging a top ring, and a motor for rotating the top ring have such respective functions that the respective motors are stopped when an overcurrent occurs in the respective motors. In this case, the allowable overcurrent depends on the capacity of the respective motors.

However, in the method in which each of the motors is stopped by detecting an overcurrent of the respective motors, since the turntable and the top ring are rotated by the respective motors, even if one of the motors is stopped due to an overcurrent, the other motors continues to be rotated. In other words, even if one of the turntable and the top ring is stopped, the other continues to be rotated, and thus the stopping one is dragged by the other element which continues to be rotated. As a result, the semiconductor wafer held by the top ring is damaged, or the top ring or the associated component in a polishing unit is damaged.

SUMMARY OF THE INVENTION

It is therefore an object of the present invention to provide a polishing apparatus having an interlock function which can prevent a workpiece which is being polished or a top ring or the associated component in the polishing unit from being damaged by detecting an abnormality of at least one of components including motors and actuators and allowing the apparatus to perform a predetermined operation such as shutdown of a plurality of components in the overall apparatus in addition to stoppage of the component which is in an abnormal condition.

According to one aspect of the present invention, there is provided a polishing apparatus having an interlock function for polishing a surface of a workpiece, comprising: a turntable having a polishing surface thereon; a top ring for holding a workpiece to be polished and pressing the workpiece against the polishing surface on the turntable; a plurality of components including a first motor for rotating the turntable, a second motor for rotating the top ring, a first actuator for lifting and lowering the top ring, a second actuator for moving the top ring in a horizontal direction; and a control unit for controlling the motors and the actuators; wherein the control unit controls the motors and the actuators in such a manner that when an abnormality is detected in at least one of the motors and the actuators, at least one of the motors and the actuators other than the at least one in which the abnormality is detected performs a predetermined operation different from a normal operation.

According to another aspect of the present invention, there is provided a polishing apparatus having an interlock function for polishing a surface of a workpiece, comprising: a turntable having a polishing surface thereon; a top ring for holding a workpiece to be polished and pressing the workpiece against the polishing surface on the turntable; a first motor for rotating the turntable; a second motor for rotating the top ring; a first actuator for lifting and lowering the top ring; a second actuator for moving the top ring in a horizontal direction; a control unit for controlling the motors and the actuators; a torque detector for measuring a torque of the second motor; and a vibration detector for measuring vibration of the top ring; wherein the control unit controls the motors and the actuators in such a manner that when at least one of values measured by the torque detector and the vibration detector is an abnormal value, the top ring is lifted and rotation of the top ring is stopped.

The above and other objects, features, and advantages of the present invention will become apparent from the following description when taken in conjunction with the accompanying drawings which illustrate preferred embodiments of the present invention by way of examples.

DETAILED DESCRIPTION OF THE PREFERRED EMBODIMENTS

A polishing apparatus having interlock function according to a first embodiment of the present invention will be described below with reference to FIGS. 1 through 4.

Figure 1:
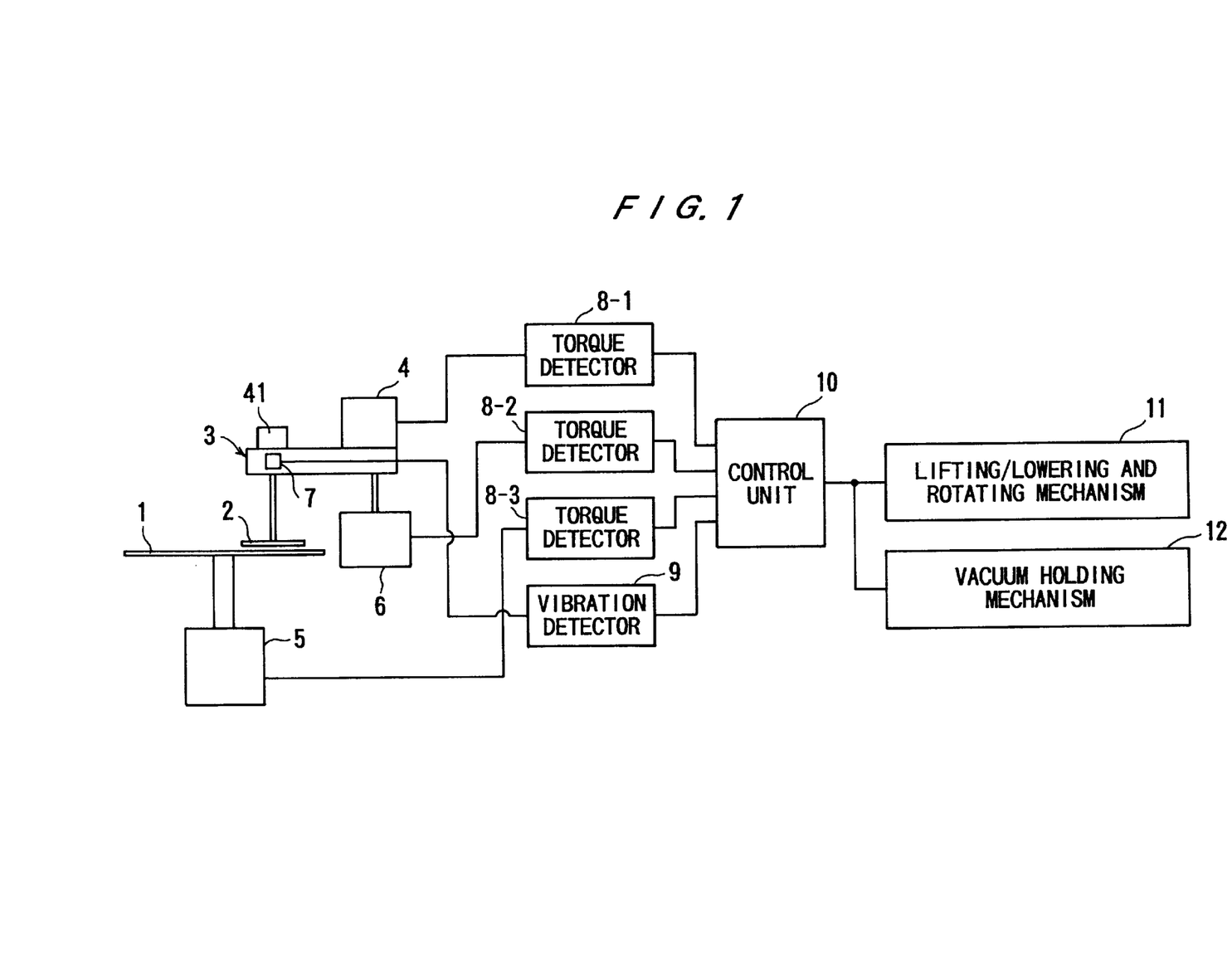
FIG. 1 is a schematic view showing a polishing apparatus having interlock function according to a first embodiment of the present invention.

As shown in FIG. 1, a polishing apparatus comprises a turntable 1 having a polishing cloth (not shown) thereon, and a top ring 2 for holding a workpiece such as a semiconductor wafer at a lower surface thereof and pressing the workpiece against the upper surface of the polishing cloth on the turntable 1. The polishing apparatus further comprises a top ring swinging mechanism 3 for swinging the top ring 2 on the turntable 1, a motor 4 for rotating the top ring 2, a motor 5 for rotating the turntable 1, and a motor 6 for driving the top ring swinging mechanism 3. A vibration sensor 7 is provided on the top ring shaft in the top ring swinging mechanism 3 for detecting vibration of the top ring swinging mechanism 3. The polishing apparatus has torque detectors 8-1, 8-2 and 8-3 for measuring respective magnitudes of torques of the motors 4, 6 and 5, and a vibration detector 9 for measuring magnitude of vibration of the top ring 2 from the output signal of the vibration sensor 7.

Further, the polishing apparatus has a control unit 10 for controlling drives of the motors 4, 5 and 6, and operation of the top ring 2. In the control unit 10, the torques of the motors 4, 6 and 5 detected by the torque detectors 8-1, 8-2 and 8-3 are compared with the torques of the motors 4, 6 and 5 at their respective normal polishing conditions to judge abnormalities of the respective torques, vibration of the top ring 2 detected by the vibration detector 9 is compared with the vibration of the top ring 2 at its normal polishing condition to judge an abnormality of the vibration, and when at least one of such abnormalities is judged to exist, signals which allow a certain component or device to perform a predetermined operation are generated and transmitted to the component or the device. In this case, signals are transmitted to a lifting/lowering and rotating mechanism 11 and a vacuum holding mechanism 12 which are in turn actuated. Further, signals are transmitted to the motors 4 and 5. The lifting/lowering and rotating mechanism 11 comprises an actuator 41 such as an air cylinder for lifting and lowering the top ring 2, and the motor 6 for swinging the top ring 2. The actuator 41 constitutes a first actuator, and the motor 6 constitutes a second actuator. The vacuum holding mechanism 12 comprises a vacuum source 42, and a passage provided in the top ring 2 and communicating with the vacuum source 42. As a result, the semiconductor wafer which is being polished is held by the lower surface of the top ring 2 under vacuum, and the top ring 2 is lifted by a predetermined height and the rotation of the top ring 2 is stopped. Then, the top ring 2 is swung to a retreat position. At the same time that the top ring 2 is lifted, the rotation of the turntable 1 is stopped.

Figure 2:
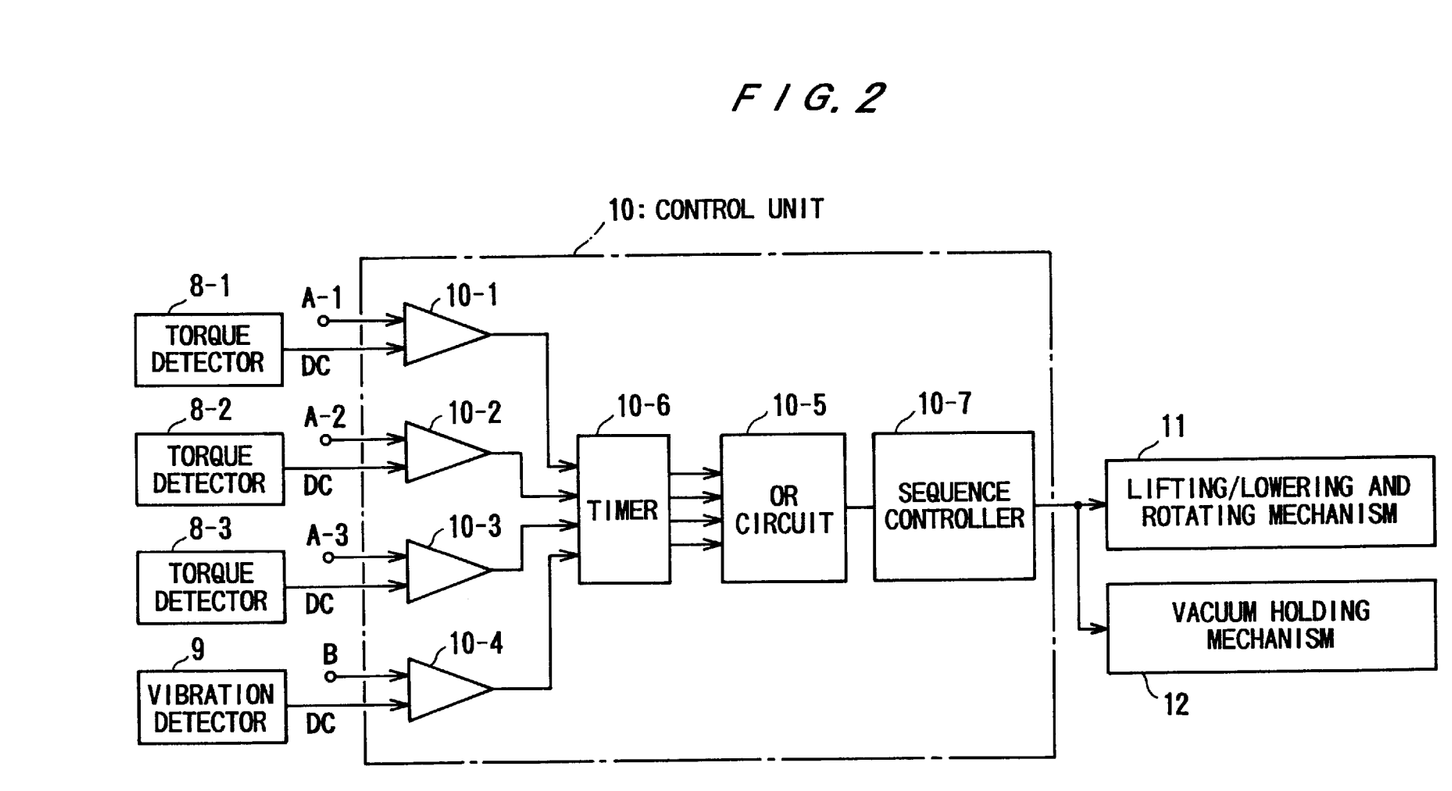
FIG. 2 is a block diagram showing a control unit of the polishing apparatus according to such embodiment of the present invention.

FIG. 2 shows the detailed structure of the control unit 10. The control unit 10 comprises comparators 10-1, 10-2, 10-3 and 10-4, a timer 10-6, an OR circuit 10-5, and a sequence controller 10-7. The output signal of the torque detector 8-1 is input into one of the input terminals of the comparator 10-1, and an allowable magnitude of the torque of the motor 4 at its normal polishing condition is input into the other input terminal A-1 of the comparator 10-1. The output signal of the torque detector 8-2 is input into one of the input terminals of the comparator 10-2, and an allowable magnitude of the torque of the motor 6 at its normal polishing condition is input into the other input terminal A-2 of the comparator 10-2. The output signal of the torque detector 8-3 is input into one of the input terminals of the comparator 10-3, and an allowable magnitude of the torque of the motor 5 at its normal polishing condition is input into the other input terminal A-3 of the comparator 10-3.

Further, the output signal of the vibration detector 9 is input into one of the input terminals of the comparator 10-4, and an allowable magnitude of vibration of the top ring 2 at its normal polishing condition is input into the other input terminal B of the comparator 10-4.

Figure 3A:
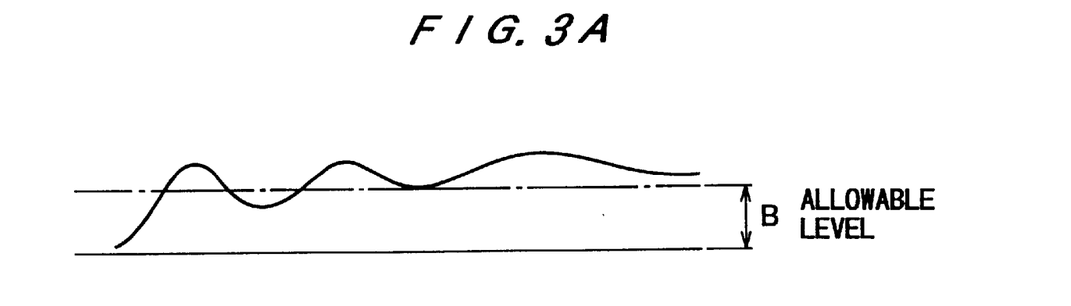
FIG. 3A is a graph showing vibration level of a top ring in the polishing apparatus.
Figure 3B:
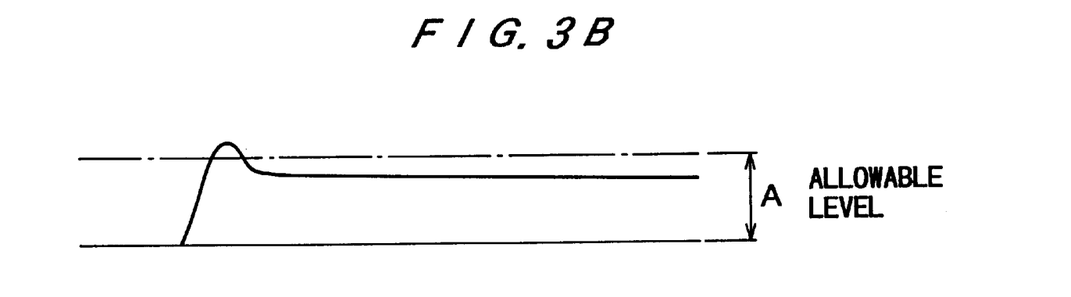
FIG. 3B is a graph showing magnitude of the torque of a motor for rotating the top ring in the polishing apparatus.

FIGS. 3A and 3B show the magnitude of the vibration of the top ring 2 and the magnitude of the torque of the motors, respectively. In FIGS. 3A and 3B, B shows an allowable level of the vibration of the top ring 2 at its normal polishing condition, and A shows an allowable level of the torque of the motors at normal polishing conditions. The allowable level A of the torques of motors 4, 6 and 5 is input into the input terminals A-1, A-2 and A-3 of the comparators 10-1, 10-2 and 10-3, respectively. The allowable level B of the vibration of the top ring 2 is input into the input terminal B of the comparator 10-4.

In the polishing apparatus, if at least one of the magnitudes of the torques of the motors 4, 5 and 6 and the magnitude of the vibration of the top ring 2 exceeds the allowable level at their normal polishing conditions, and such state continues for a predetermined period of time which is set in the timer 10-6, then the timer 10-6 produces an output signal, the OR circuit 10-5 produces an output signal, and the sequence controller 10-7 is actuated. In an example shown in FIG. 3A, the timer 10-6 produces an output signal because a predetermined period of time has elapsed. In an example shown in FIG. 3B, the timer 10-6 produces no output signal because a predetermined period of time has not elapsed.

When the sequence controller 10-7 is actuated, a signal indicative of the actuation of the sequence controller 10-7 is supplied to the vacuum holding mechanism 12 and the lifting/lowering and rotating mechanism 11. Then, the vacuum holding mechanism 12 is actuated to hold the semiconductor wafer which is being polished by the top ring 2 under vacuum, and the lifting/lowering and rotating mechanism 11 is actuated, and thus the top ring 2 is lifted by a predetermined height and the rotation of the top ring 2 is stopped. Then, the top ring 2 is swung to the retreat position. At the same time that the top ring 2 is lifted, the rotation of the turntable 1 is stopped. In this manner, even if at least one of the torques of the motors 4, 5 and 6 and the vibration of the top ring 2 is in an abnormal condition, the semiconductor wafer is prevented from being damaged, and the component of the top ring 2 and the component associated with the polishing unit are prevented from being damaged.

Figure 4:
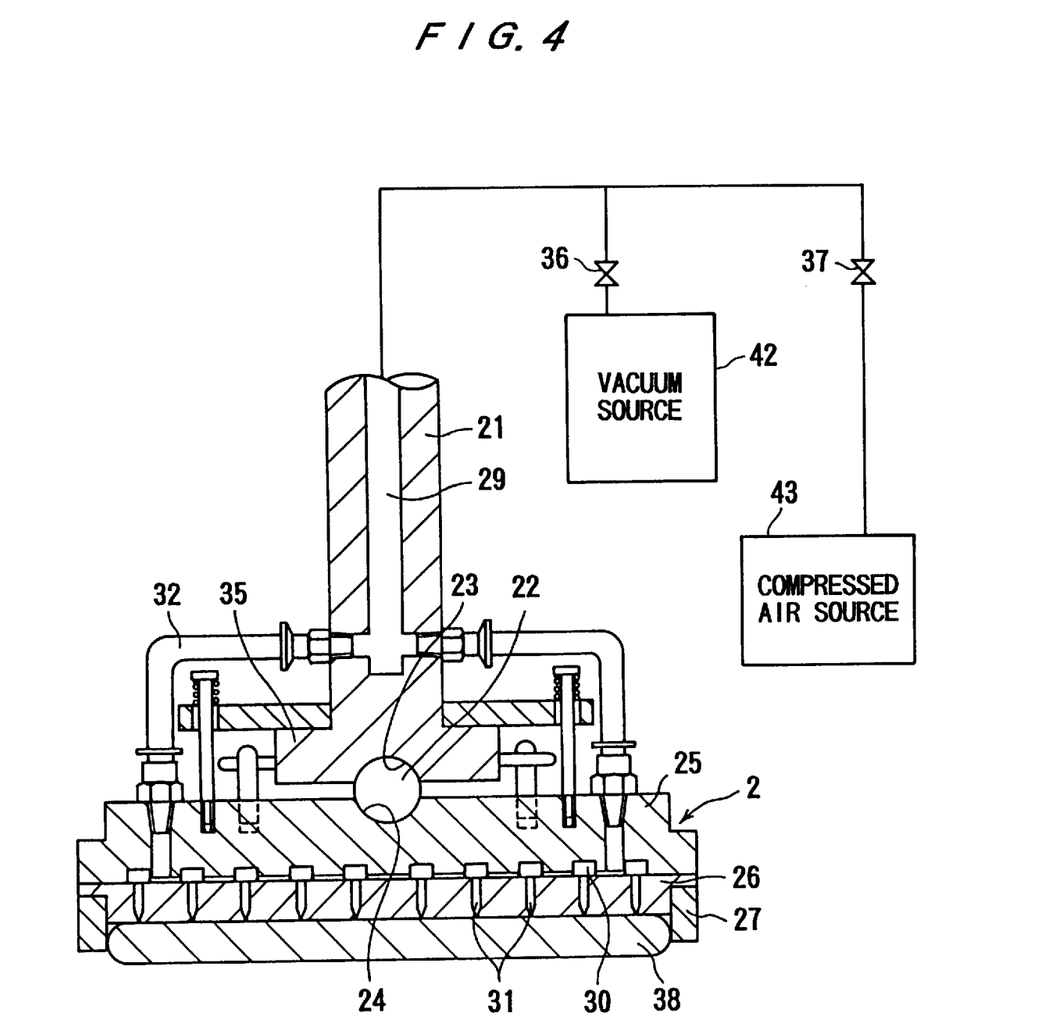
FIG. 4 is a vertical cross-sectional view showing the top ring in the polishing apparatus according to such embodiment of the present invention.

FIG. 4 shows the structure of the top ring 2. As shown in FIG. 4, the top ring 2 comprises a driving shaft 21 having a flange 35 at a lower portion thereof, a top ring body 25, and a ball 22 which is seated on an upper seat 23 of the flange 35 and a lower seat 24 of the top ring body 25. A pressure plate 26 is fixed to the top ring body 25, and a guide ring 27 is provided at a lower periphery of the pressure plate 26. The pressure plate 26 has a plurality of through holes 31, and the top ring body 25 has a plurality of grooves 30. A hole 29 is formed in the central part of the driving shaft 21. The hole 29 communicates with the vacuum source 42 and a compressed air source 43, and the hole 29 communicates with the grooves 30 and the holes 31 through flexible tubes 32. By opening a valve 36 serving as a part of the vacuum holding mechanism 12, the holes 31 of the pressure plate 26 communicate with the vacuum source 42 through the grooves 30, the flexible tubes 32 and the hole 29, and hence the semiconductor wafer 38 can be held by the lower surface of the pressure plate 26 under vacuum. By opening a valve 37, the holes 31 of the pressure plate 26 communicate with the compressed air source 43, and hence the semiconductor wafer can be removed from the lower surface of the pressure plate 26.

In the above embodiment, the torques of the motors 4, 5 and 6 are detected, and when at least one of the torques is in an abnormal condition, not only the motor which is in an abnormal condition but also other motors are controlled so as to perform respective predetermined operations by the interlock function of the control unit 10. Although the torques of the motor 4 for rotating the top ring 2, the motor 5 for rotating the turntable 1 and the motor 6 for driving the top ring swinging mechanism 3 are detected in this embodiment, the torque of any other motor may be detected. Further, in the embodiment, the vibration of the top ring 2 is detected, and when the magnitude of the vibration is in an abnormal condition, not only the top ring 2 but also other components are controlled so as to perform respective predetermined operations by the interlock function of the control unit 10. However, a member whose vibration is detected is not limited to the top ring 2, and it is possible that the vibration of the member associated with the polishing unit is detected, and when the magnitude of the vibration of such member is in an abnormal condition, the interlock function is effected.

Figure 5:
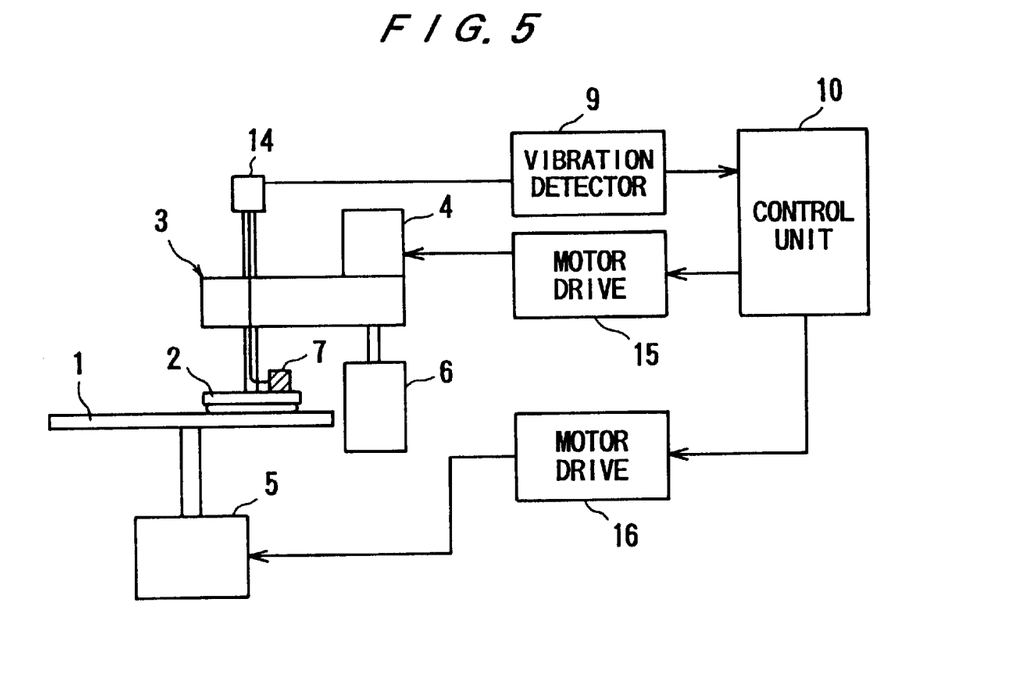
FIG. 5 is a schematic view showing a polishing apparatus having interlock function according to a second embodiment of the present invention.

FIG. 5 shows a second embodiment of the present invention. The second embodiment is different from the first embodiment in that the torques of the motors are not measured, and only vibration of the top ring is measured by a vibration sensor attached to the top ring to detect an abnormality. That is, a vibration sensor 7 is attached to the top ring 2 which is a rotating member, and a signal indicative of vibration is transmitted from the vibration sensor 7 to a vibration detector 9 through a rotary connector or a slip ring 14. When the vibration sensor 7 detects an abnormality of the top ring 2, the top ring 2 and other components are operated in the same manner as the first embodiment. In the control unit 10, judgment of the abnormality and generation of a signal for operation are carried out in the same manner as the first embodiment. Motor drives 15 and 16 are provided to control rotational speeds of the motors 4 and 5, respectively.

Figure 6:
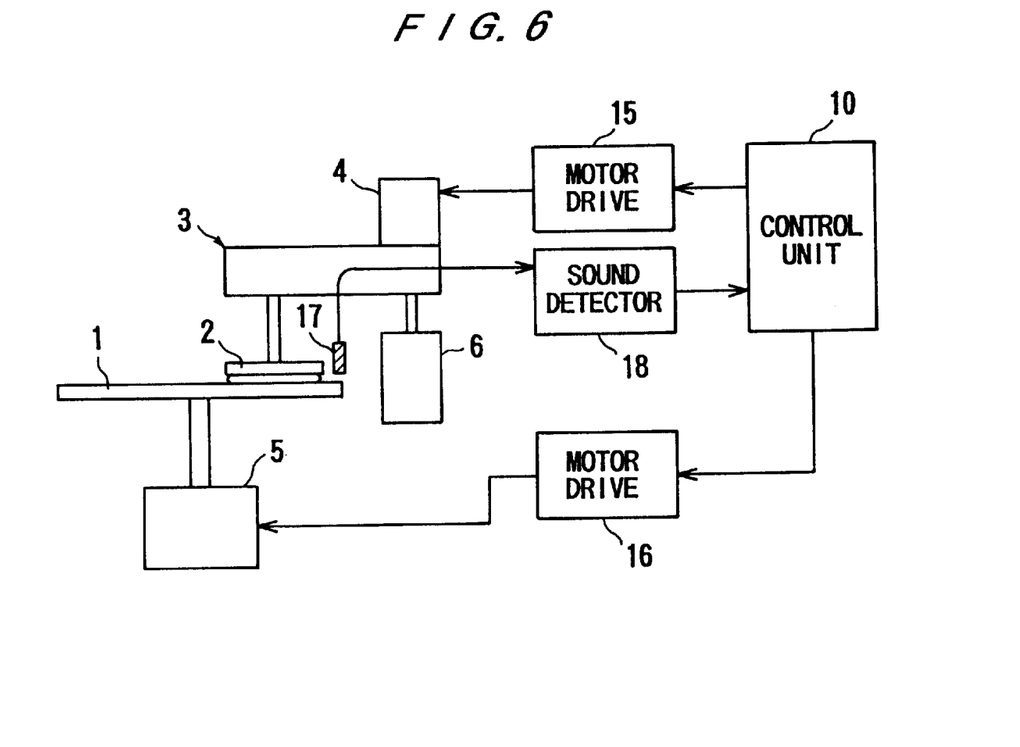
FIG. 6 is a schematic view showing a polishing apparatus having interlock function according to a third embodiment of the present invention.

FIG. 6 shows a third embodiment of the present invention. In this embodiment, sound of the polishing part is detected by a microphone 17 disposed in the vicinity of the top ring 2 and a sound detector 18 connected to the microphone 17, and an abnormality of the polishing condition is detected from the sound of the polishing part. Other structures of the third embodiment of FIG. 6 are the same as the second embodiment of FIG. 5. In first through third embodiments, the magnitudes of the vibration and the sound are treated in the form of an effective values.

Figure 7:
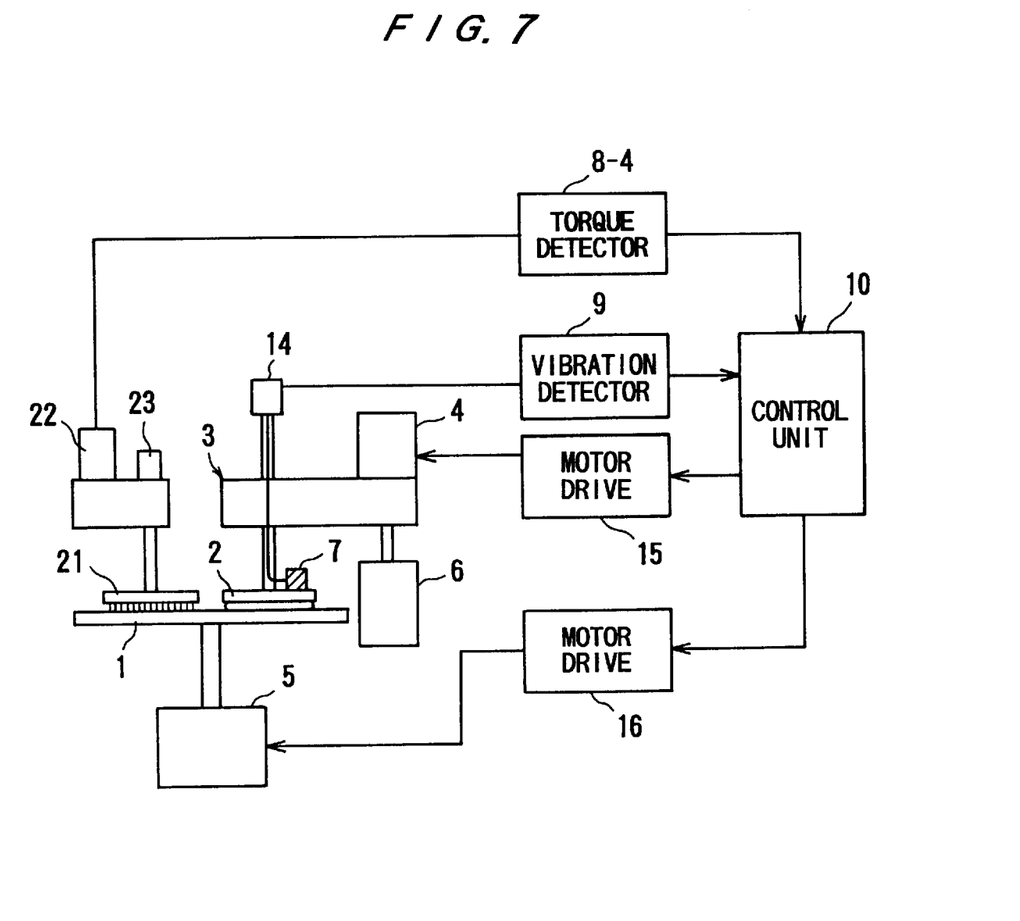
FIG. 7 is a schematic view showing a polishing apparatus having interlock function according to a fourth embodiment of the present invention.

FIG. 7 shows a fourth embodiment of the present invention. The fourth embodiment of the present invention is different from the first embodiment in that a dressing unit for dressing a polishing cloth is provided to restore the condition of the polishing cloth. That is, the polishing apparatus further comprises a dressing unit comprising a dressing tool 21 which is positioned in diametrically opposite relation to the top ring 2. The dressing tool 21 is coupled to a motor 22 and also to a lifting/lowering air cylinder 23. The motor 22 is connected to a torque detector 8-4 which is connected to the control unit 10. The motors 4, 5 and 6 are connected to the torque detectors (not shown), respectively in the same manner as the first embodiment shown in FIG. 1. When at least one of the torque detectors 8-4 and 8-3 (see FIG. 1) detects an abnormality in the dressing tool 21 or the turntable 1 during a dressing process, the dressing tool 21 is lifted by actuation of the air cylinder 23 and rotation of the dressing tool 21 is stopped. At the same time, the rotation of the turntable 1 is stopped.

As described above, according to the present invention, the torques of the motors and the vibration of the polishing unit are detected, and the detected torques and vibration are compared with torques and vibration at normal polishing conditions. When at least one of the detected torques and vibration is in an abnormal condition, not only the component which is in an abnormal condition but also other components are controlled so as to perform a predetermined operation by the interlock function of the control unit 10. Therefore, the workpiece which is being polished is prevented from being damaged or the top ring or the component associated with the polishing unit in the polishing apparatus can be prevented from being damaged. Further, since the top ring is lifted and moved to the retreat position and the dressing tool is lifted, and the top ring and the dressing tool are detached from the turntable. If the abnormality occurs at the turntable, the top ring and the dressing unit are little affected by the abnormality. If an abnormality is detected based on the motor torques and the abnormality seems to be serious, it may be possible to stop the rotations of the top ring and the dressing tool without lifting.

Although certain preferred embodiments of the present invention have been shown and described in detail, it should be understood that various changes and modifications may be made thereto without departing from the scope of the appended claims.

What is claimed is:

1. A polishing apparatus for polishing a surface of a workpiece and having an interlock function, said apparatus comprising:

a turntable having thereon a polishing surface;

a top ring for holding a workpiece to be polished and for pressing the workpiece against said polishing surface;

a plurality of components including first motor for rotating said turntable during normal operation, a second motor for rotating said top ring during normal operation, a first actuator for lowering said top ring during normal operation and for lifting said top ring, and a second actuator for moving said top ring in a horizontal direction during normal operation, at least a first of said components being capable of developing an abnormality indicative of a change of said at least first component other than a change of a surface condition of the workpiece being polished;

a detector to detect development of said abnormality; and a control unit, responsive to detection of said abnormality by said detector, for causing at least a second of said components, other than said at least first component in which said abnormality is detected, to perform a predetermined operation different from said normal operation thereof, said causing comprising at least operating said first actuator to lift said top ring.

2. An apparatus as claimed in claim 1, wherein plural of said components are capable of developing respective abnormalities.

3. An apparatus as claimed in claim 1, wherein all of said components are capable of developing respective abnormalities.

4. An apparatus as claimed in claim 1, wherein said detector comprises a torque detector for measuring torque of at least one of said first motor and said second motor.

5. An apparatus as claimed in claim 1, wherein said detector comprises torque detectors for measuring respective torques of said first motor and of said second motor.

6. An apparatus as claimed in claim 1, wherein said detector comprises a vibration detector for measuring vibration of said top ring.

7. An apparatus as claimed in claim 6, wherein said vibration detector is attached to said top ring.

8. An apparatus as claimed in claim 1, wherein said detector comprises a vibration detector for measuring vibration within said apparatus.

9. An apparatus as claimed in claim 1, wherein said detector comprises a sound detector for measuring sound emitted within said apparatus.

10. An apparatus as claimed in claim 9, wherein said sound detector is positioned adjacent said top ring.

11. An apparatus as claimed in claim 1, wherein said detector is operable to measure a value of at least one of a torque of one of said motors, vibration within said apparatus, and sound emitted within said apparatus.

12. An apparatus as claimed in claim 11, comprising means for comparing the thus measured value with a value representative of normal operation.

13. An apparatus as claimed in claim 1, wherein said causing further comprises operating said second motor to stop rotation of said top ring.

14. An apparatus as claimed in claim 1, wherein said causing further comprises operating said second actuator to move said top ring in a horizontal direction to a retreat position.

15. An apparatus as claimed in claim 1, further comprising a dressing tool for dressing said polishing surface of said turntable, and said plurality of components further includes a third motor for rotating said dressing tool and a third actuator for lowering said dressing tool during normal operation and for lifting said dressing tool, said third motor and said third actuator being capable of developing an abnormality, and wherein said control unit is operable to, when an abnormality occurs in either of said third motor or said third actuator, cause said third actuator to lift said dressing tool and cause said third motor to stop rotation of said dressing tool.

16. A polishing apparatus for polishing a surface of a workpiece and having an interlock function, said apparatus comprising:

a turntable having thereon a polishing surface;

a top ring for holding a workpiece to be polished and for pressing the workpiece against said polishing surface;

a plurality of components including first motor for rotating said turntable, a second motor for rotating said top ring, a first actuator for lowering said top ring, and a second actuator for moving said top ring in a horizontal direction;

a torque detector for measuring a torque of said second motor;

a vibration detector for measuring vibration of said top ring; and a control unit for, when at least one of values measured by said torque detector and by said vibration detector is indicative of an abnormal value representative of a change of said second motor or of said top ring other than a change of a surface condition of the workpiece being polished, causing said first actuator to lift said top ring and causing said second motor to stop rotation of said top ring.

17. An apparatus as claimed in claim 16, wherein said vibration detector is attached to said top ring.

18. An apparatus as claimed in claim 16, comprising means for comparing said values measured by said torque detector and by said vibration detector with respective values representative of normal operation.

19. An apparatus as claimed in claim 16, further comprising a dressing tool for dressing said polishing surface of said turntable, a third motor for rotating said dressing tool, and a third actuator for lowering said dressing tool, and wherein said control unit is operable to, when an abnormality occurs in either of said third motor or said third actuator, cause said third actuator to lift said dressing tool and cause said third motor to stop rotation of said dressing tool.

20. A method of polishing a surface of a workpiece, said method comprising:

rotating a turntable having a polishing surface by a first motor during normal operation thereof;

rotating a top ring by a second motor during normal operation thereof;

holding a workpiece by said top ring and pressing said workpiece against said polishing surface by a first actuator during normal operation thereof;

moving said top ring and said workpiece held thereby in a horizontal direction by a second actuator during normal operation thereof;

at least one component among said first motor, said second motor, said first actuator and said second actuator being capable of developing an abnormality indicative of a change of said at least one component other than a change of a surface condition of said workpiece during polishing thereof;

detecting development of said abnormality in said at least one component; and in response to said detecting, causing another one of said components, other than said at least one component in which said abnormality is detected, to perform a predetermined operation other than said normal operation thereof, said causing comprising at least operating said first actuator to lift said top ring.

21. A method as claimed in claim 20, wherein plural of said components are capable of developing respective abnormalities.

22. A method as claimed in claim 20, wherein all of said components are capable of developing respective abnormalities.

23. A method as claimed in claim 20, wherein said detecting comprises measuring torque of at least one of said first motor and said second motor.

24. A method as claimed in claim 20, wherein said detecting comprises measuring respective torques of said first motor and of said second motor.

25. A method as claimed in claim 20, wherein said detecting comprises measuring vibration of said top ring.

26. A method as claimed in claim 20, wherein said detecting comprises measuring vibration within said apparatus.

27. A method as claimed in claim 20, wherein said detecting comprises measuring sound emitted within said apparatus.

28. A method as claimed in claim 20, wherein said detecting comprises measuring a value of at least one of a torque of one of said motors, vibration within said apparatus, and sound emitted within said apparatus.

29. A method as claimed in claim 28, comprising comparing the thus measured value with a value representative of normal operation.

30. A method as claimed in claim 30, wherein said causing further comprises operating said second motor to stop rotation of said top ring.

31. A method as claimed in claim 20, wherein said causing further comprises operating said second actuator to move said top ring in a horizontal direction to a retreat position.

32. A method as claimed in claim 20, further comprising dressing said polishing surface of said turntable by rotating a dressing tool by a third motor and lowering said dressing tool by a third actuator, said third motor and said third actuator being capable of developing an abnormality, detecting development of an abnormality in said third motor or in said third actuator, and when an abnormality is detected in either of said third motor or said third actuator causing said third actuator to lift said dressing tool and causing said third motor to stop rotation of said dressing tool.

33. A method of polishing a surface of a workpiece, said method comprising:

rotating a turntable having a polishing surface by a first motor;

rotating a top ring by a second motor;

holding a workpiece by said top ring and pressing said workpiece against said polishing surface by a first actuator;

moving said top ring and said workpiece held thereby in a horizontal direction by a second actuator;

measuring a torque of said second motor;

measuring vibration of said top ring; and when at least one of a measured value of said torque and a measured value of said vibration is indicative of an abnormal value representative of a change of said second motor or of said top ring other than a change of a surface condition of said workpiece being polished, causing said first actuator to lift said top ring and causing said second motor to stop rotation of said top ring.

34. A method as claimed in claim 33, further comprising dressing said polishing surface of said turntable by rotating a dressing tool by a third motor and lowering said dressing tool by a third actuator, said third motor and said third actuator being capable of developing an abnormality, detecting development of an abnormality in said third motor or in said third actuator, and when an abnormality is detected in either of said third motor or said third actuator causing said third actuator to lift said dressing tool and causing said third motor to stop rotation of said dressing tool.

* * * * *